United States Patent
Monroe (12)

(10) Patent No.: US 6,418,728 B1
(45) Date of Patent: Jul. 16, 2002

(54) THERMOELECTRIC WATER PRE-COOLING FOR AN EVAPORATIVE COOLER

(76) Inventor: Jerry Monroe, 7405 W. Banff La., Peoria, AZ (US) 85381

( * ) Notice: Subject to any disclaimer, the term of this patent is extended or adjusted under 35 U.S.C. 154(b) by 0 days.

(21) Appl. No.: 09/568,610

(22) Filed: May 10, 2000

(51) Int. Cl.[7] .............................. F25B 21/02; F28D 5/00
(52) U.S. Cl. ............................................. 62/3.2; 62/310
(58) Field of Search ........................ 62/3.2, 310, 304, 62/91, 121, 259.4

(56) References Cited

U.S. PATENT DOCUMENTS 4,353,219 A * 10/1982 Patrick, Jr. .................... 62/305
4,612,778 A * 9/1986 Medrano ..................... 62/304 X
5,383,337 A * 1/1995 Baker ......................... 62/310 X

* cited by examiner

Primary Examiner—William Doerrler
Assistant Examiner—Chen-Wen Jiang
(74) Attorney, Agent, or Firm—Fuess & Davidenas

(57) ABSTRACT

The operational range of the evaporative cooler means, particularly one chilling air and/or water to 79° F. or less when the outside ambient air temperature rises to 120° F. at a relative humidity as high as 50%, is extended by pre-cooling the intake water with a thermoelectric heating/cooling element, typically of about 5 kw. capacity. The extension of the operational range of the evaporative cooler so realized obviates, or reduces, use of an expensive parallel air conditioning system in the cooling of buildings, particularly houses, in hot but generally dry climates, such as in the inland regions of the Southwestern United States.

6 Claims, 3 Drawing Sheets

THERMOELECTRIC WATER PRE-COOLING FOR AN EVAPORATIVE COOLER

BACKGROUND OF THE INVENTION

1. Field of the Invention

The present invention generally concerns evaporative coolers, and particularly concerns evaporative coolers in which water or air that is used by the cooler is itself pre-cooled, particularly by use of electricity and more particularly by action of a thermoelectric cooling element.

2. Description of the Prior Art 2.1 Evaporative Coolers and Cooling Systems

The following discussion is taken in substantial part from the paper *Evaporative Cooling System for Aquacultural Production* by C. D. Baird, R. A. Bucklin, C. A. Watson and F. A. Chapman appearing as Fact Sheet EES-100, a series of the Florida Energy Extension Service, Florida Cooperative Extension Service, Institute of Food and Agricultural Sciences, University of Florida (publication date: March 1993).

2.1.1 What is Evaporative Cooling?

For a simplistic understanding of evaporative cooling, the air may be though of as being like a sponge. Similar to a sponge, air has an ability to absorb moisture that it comes in contact with. The amount of moisture that the air will absorb depends on the condition of the air, or specifically, (i) how much moisture the air already contains and (ii) the temperature of the air. If the air is warm and contains only a small amount of moisture, then it will more readily absorb moisture. As air cools, its volume decreases, and with it, its ability to absorb moisture decreases. After all, how easily you can clean up a spill depends on the capacity of the sponge that you are using.

The term "relative humidity" describes the quantity of water in the air in relation to its total capacity. Any volume of air at any given temperature has an ability to hold a certain quantity of moisture. If the air contains 20% of its total capacity to hold moisture, the relative humidity is said to be 20%. A relative humidity of 100% indicates that the air at this temperature and pressure is holding all the moisture it can. If the air has a low relative humidity when entering an evaporative cooler (explained in the next section), then it has the ability to hold more moisture, and will thus evaporate more water and cool more effectively.

When describing the amount of moisture in the air, the term relative humidity is used because the "sponginess" of air changes relative to air temperature. The warmer the air, the more spongy it becomes, and the more water it can hold. That is to say that if air at any temperature has a 100% relative humidity then it can hold no more water vapor (at that temperature). However, if the air is heated, it expands, and as a result the relative humidity decreases even though the total amount of water vapor in the air has not changed. As a result, we must describe the level of humidity relative to the condition of the sponge we are talking about. Is it a 50° F. sponge or an 80° F. sponge? An 80° F. sponge will hold more water at 50% humidity than will a 50° F. sponge.

Evaporative cooling works on the physical principle that in order to evaporate water, heat (energy) is required. In fact, the evaporation of one gallon of water requires almost 8,700 BTU's of heat. Where does this heat come from? It come from whatever the water is in contact with as it evaporates. This could be a hot sidewalk, a human body, a tree, from the air itself, or a wet cooling pad. As the heat is removed from an object, the temperature of that object is decreased—in this case, the air.

It is important to realize that the temperature of the water does not have a great effect upon the cooling produced through the evaporation. If one was to place a gallon of 50° F. water on a warm sidewalk, it would produce 9,000 BTUs of cooling by consuming the heat to perform the evaporation. A gallon of 90° F. water would produce 8,700 BTUs of cooling, only a 3 percent difference. After all, if you were sprayed with water at either of these temperatures on a hot day, you would still feel much cooler.

Typical BTUs removed from the air based on a given amount of water consumed in an hour are as follows: Ten (10) U.S. gallons (37.8 Liters or 8.3 Imperial Gallons) of water suffices to remove 87,000 BTU's. Twelve (12) U.S. gallons (45.4 Liters or 10.0 Imperial Gallons) suffices to remove 104,400 BTU's. Fourteen (14) U.S. gallons (53.0 Liters or 11.7 Imperial Gallons) suffices to remove 121,800 BTU's.

In simple terms, evaporative cooling is nature's way of cooling.

2.1.2 Humidity and Evaporative Cooling

As previously stated, a cubic volume of air at a certain temperature and pressure has the ability to absorb and to hold a certain amount of water vapor. If a volume of air contains 50% of the amount of moisture that it is capable of holding, it is said to be at 50% relative humidity. The higher the temperature of the air, the higher the amount of moisture it is capable of holding. Any change in the temperature without a corresponding change in the pressure results in an increase or decrease in the ability of the air to contain water vapor.

If the temperature increases without an increase in the pressure, the result is a decrease in the relative humidity, and thus an increase in its ability to hold more moisture. That is to say that in the morning the humidity may be high, but as the day passes and the temperature increases then the relative humidity will naturally decrease.

The extent to which relative humidity decreases through the day can be affected by local weather systems and proximity to large bodies of water. If an increase in temperature is accompanied by a weather system containing moisture, the decrease in humidity will not be as great. But, the fact remains that relative humidity does drop as air temperature increases. In fact, for every 20° F. rise in temperature, the moisture-holding ability of air doubles. For instance, if the temperature of the air was 70°F. and the relative humidity was 100% at 5 a.m., and the temperature increased to 90° F. at noon, the moisture holding ability of the air would double.

As a result, the air would now be holding only half of the moisture it is capable of holding, and the relative humidity of the air would drop to 50%.

The hotter the day, the drier the air becomes, and the more cooling that can take place through the evaporation of water. This means that when the day gets hot enough to require cooling, the relative humidity will be much lower than in the morning and allow an evaporative cooler to work well.

Since any evaporative cooling device must evaporate water to achieve cooling, more water vapor is put into the air. As the abient relative humidity increases, it becomes more difficult to put moisture into the air. The efficiency of any evaporative cooling device is directly related to its ability to evaporate water (a cooling process) at a given relative humidity. A unit with low efficiency will cool only at low relative humidity levels, while a unit with high efficiency can achieve effective cooling at much higher humidity levels.

Evaporative coolers are extremely energy efficient because there is no compressor or refrigeration cycle involved. Evaporative coolers can replace an air-conditioning system in hot, dry climates. Ventilation is increased and cooling costs reduced.

2.1.3 How Evaporative Cooling Works

Evaporative cooling occurs when water is brought in contact with air that has a wet bulb temperature lower than that of the water. As the air and water remain in contact, the heat required for evaporation is taken from the water and the air causing both the water and the air to be cooled. Therefore, evaporative cooling can be used to cool water (e.g., cooling towers for commercial air conditioning) or air (e.g., evaporative pad cooling for greenhouses). For the system of the present invention, evaporative cooling is used to directly cool water, which in turn cools air. Therefore system may be considered to cool both water and air.

The amount of cooling that can be accomplished through the evaporative process depends on the humidity level of the air—the dryer the air, the greater the evaporative cooling potential. However, the water and/or air can not be cooled by evaporative cooling to a temperature lower than the wet bulb temperature of the air. The wet bulb temperature can be measured by placing a wet wick over a thermometer and blowing air across it. For example, on a day when the dry bulb temperature is 95° F. and the relative humidity is 50%, the corresponding wet bulb temperature is 79° F.—the lower limit for evaporative cooling.

Since 79° F. is at the high end of a comfortable indoor temperature range, and outdoor temperatures may often exceed, for example, 95° F. and/or the relative humidity may exceed, for example, 50%, evaporative cooling alone often proves inadequate to cool building on hotter and/or moister days in many U.S. locations. The classical compromise between the energy efficiency of an evaporative cooler and the greater heat and temperature recovery capacity of air conditioning has been to use an evaporative cooler to cool a building during suitable morning and evening hours, while turning off the evaporative cooler and relying on air conditioning for the hottest mid-day hours. The means, of course, the economic investment in each cooling system—the evaporative cooler and the air conditioner—is being used but part of the time.

It would thus be desirable to extend the operative range of an evaporative cooler (without, or course, violating the laws of physics)—especially if the very significant expense of a parallel air conditioning system for building cooling could be completely avoided. Certain previous attempts to do so are discussed in section 2.1.4, following.

When a liquid changes to a vapor, it evaporates and absorbs heat. Evaporative coolers get their name from this process. These devices blow air over a water-soaked pad. As the water evaporates, it cools the air. Various models are available that mount on the roof, wall or window.

The most common type of evaporative cooler is called the "direct" type. It blows outside air over the wet pad and then into your home. This will increase the humidity. Slightly higher indoor humidity usually isn't a problem for many inland areas of the United States, including most of Arizona, New Mexico and Southern California. Another type of evaporative cooler is called "indirect." This type of cooler puts no additional humidity into the indoor air. Some evaporative cooling units, called "direct/indirect," combine both methods.

Evaporative coolers reduce air temperature just as effectively as "air conditioners," but use only about 16 percent of the electricity. However, evaporative coolers use from 5 to 15 gallons of water per day. The typical cost of a house-size evaporative cooler is from $1500–$2200 each. The typical yearly savings in electricity (@ 10 cents per kilowatt hour) over air conditioning is a few hundred dollars.

2.1.4 Specific Prior Art Extended-Range Evaporative Coolers

U.S. Pat. No. 4,612,778 to Medrano issued Sep. 23, 1986, for a PRECOOLER FOR AN EVAPORATIVE COOLER concerns an evaporative cooler for the enhancement of the cooling effectiveness and efficiency of an existing cooling system. The cooler includes (i) an auxiliary shell incorporating evaporator pads, and (ii) a water distribution spider that is supplied by the water pump of the conventional cooler over which the shell is installed.

U.S. Pat. No. 5,022,241 to Wilkinson issued Jun. 11, 1991 for a RESIDENTIAL HYBRID AIR CONDITIONING SYSTEM assigned to Gas Research Institute (Chicago, Ill.) concerns a residential-type hybrid air conditioning system having (i) a conventional refrigeration subsystem which handles system sensible heat loads and (ii) a liquid desiccant dehumidification subsystem which handles system latent heat loads. The system additionally incorporates (iii) an evaporative cooler which cooperates with and receives heat from the dehumidification subsystem to increase the performance efficiency of the total system.

U.S. Pat. No. 5,193,352 to Smith, et. al. issued Mar. 16, 1993 for an AIR PRE-COOLER METHOD AND APPARATUS and assigned to AMSTED Industries, Inc. (Chicago, Ill.) concerns an apparatus and method for cooling air. The apparatus includes an indirect evaporative cooler, a direct-contact ice-water chiller, a reheat coil component, an ice-thermal-storage component and an ice-manufacturing refrigeration chiller to provide alternative air-flow paths and alternative component combinations. The method of operating the apparatus provides alternative fluid-flow paths through selected combinations of the several components to effect the desired lowering of air temperature, relative humidity and air density in the cooled air.

U.S. Pat. No. 5,383,337 to Baker issued Jan. 24, 1995, for a METHOD AND APPARATUS FOR PRECOOLING WATER SUPPLIED TO AN EVAPORATIVE COOLER WITH A SUBTERRANEAN HEAT EXCHANGER concerns an apparatus for precooling water supplied to an evaporative cooler of the type known as a "swamp cooler". The apparatus includes inlet and outlet reservoirs secured by brackets to a bottom surface of the evaporative cooler water pan at substantially the same elevation. The inlet and outlet reservoirs are connected in fluid communication with a subterranean vessel enclosing a cooling coil. In use, water is supplied to the inlet reservoir and maintained at a predetermined level by a float valve assembly. A filtered drain line returns water from the evaporative cooler pan into the inlet reservoir from which it drains by gravity flow into the cooling coil within the subterranean vessel. The water circulates within the coil to pre-cool and thereafter discharges and mixes within the vessel. A pump in the outlet reservoir pumps water from a return line communicating with the vessel back to the evaporative cooler.

U.S. Pat. No. 4,308,222 to Goettel, et. al. issued Dec. 29, 1981, for an EVAPORATIVE COOLER concerns an apparatus for evaporatively cooling air. The apparatus includes an air moving mechanism for supplying air under pressure to an evaporator duct wherein water is sprayed into the airstream countercurrent to the airflow direction. The evaporator duct is especially configured to inhibit moisture migration toward the air moving device and the sprayed water is pre-cooled to increase operating efficiency. A second stage of evaporative cooling may be included by tandem coupling a second stage evaporator duct to the outlet of the first stage evaporator duct.

U.S. Pat. No. 5,003,789 to Gaona, et. al. issued Apr. 2, 1991, for a MIST AIR CONDITIONER FOR EVAPORATIVE COOLER concerns a precooler for enhancing the cooling effectiveness and efficiency of an existing evaporative cooling system. The precooler employs a misting system for precooling the ambient air before entering the air flow inlet to the evaporative cooler.

U.S. Pat. No. 5,390,502 to Storbeck, et. al. issued Feb. 21, 1995, for a NON-FREEZE CLOSED LOOP EVAPORATED COOLING SYSTEM assigned to Oven Systems, Inc. (Milwaukee, Wis.) concerns a precooling system for an evaporative cooler for a closed loop cooling fluid system includes a supplemental heat exchanging coil connected in the cooling fluid loop upstream of the main evaporative cooler coils and positioned in the outlet air flow through the evaporative cooler, but above or outside the path of the spray water. The supplemental heat exchanging coil provides enough additional cooling capacity to allow the spray water system to be completely shut off and the spray water sump drained during low outside ambient temperature operation. Freeze up of the sump and other parts of the spray water system are completely eliminated and a substantial saving in spray water consumption and energy for freeze prevention systems is asserted to be realized.

2.2 Thermolectric Cooling Elements

Meanwhile, and in another heating and cooling technology area entirely, a thermoelectric cooler, or "TEC", is a device that uses electricity to affect heat transfer. The TEC accomplishes this task by actually pumping the heat away from the component surface utilizing a principle referred to as the "Peltier effect." In essence this principle states that a temperature change will result when a current is run through the junction of two dissimilar conductors. These two conductors consist of a metal that contains an excess of electrons (negative or n-type), and another metal that is electron deficient (positive or p-type). The conductors are connected electrically in series, thermally in parallel, and are sandwiched between two ceramic plates. When connected to a DC power supply, electrons will move from the p-type material to the n-type causing a temperature change between the ceramic plates. The movement of the electrons transfer the heat from one ceramic plate to the opposite plate where it is dissipated. One side of the T.E.C. (that which is normally in contact with a heat source) becomes cold, while the other becomes hot. Heat is removed through the use of a heat sink and fan. The T.E.C. is an active cooling device which lowers the operating temperature of any component with which it is in thermal communication. This device is often referred to as a "heat pump", "thermoelectric module", or "Peltier device". For further information, see the *CRC Handbook of Thermoelectrics*, Editor D. M. Rowe, University of Wales College of Cardiff, U.K. (1997).

A thermoelectric module is a small solid state device that can operate as a heat pump or as an electrical power generator. When used to generate electricity, the module is called a thermoelectric generator (TEG). When used as a heat pump, the module utilizes the Peltier effect to move heat and is called a thermoelectric cooler (TEC). The Peltier effect was discovered in 1834. When current passes through the junction of two different types of conductors it results in a temperature change. However, the practical application of this concept required the development of semiconductors that are good conductors of electricity but poor conductors of heat—the perfect balance for TEC performance. Today, bismuth telluride is primarily used as the semiconductor material, heavily doped to create either an excess (n-type) or a deficiency (p-type) of electrons.

Very simply, a TEC consists of a number of p- and n-type pairs (couples) connected electrically in series and sandwiched between two ceramic plates. When connected to a DC power source, current causes heat to move from one side of the TEC to the other. Naturally, this creates a hot side and a cold side on the TEC. A typical application exposes the cold side of the TEC to the object or substance to be cooled and the hot side to a heat sink which dissipates the heat to the environment. A heat exchanger with forced air or liquid may be required. (As clever as TECs are, they can neither created nor destroy heat—only move it!)

If the current is reversed, the heat is moved in the opposite direction. In other words, what was the hot face will become the cold face and vice-versa.

A TEC cannot normally pump sufficient heat as would permit, for example, the cooling of an entire house. The maximum amount of heat the largest single TEC can pump is about 125 watts. So a complete house could not normally be cooled with TEC's (and is not so cooled in the present invention). It should be understood, however, that the modular design of TECs permits several to be used per application to move more heat. Multiple TEC's can be used both side-by-side to increase the amount of heat pumped, or they can be stacked on top of one another to increase the temperature difference across the combined TEC. When stacked, they are called "cascades", or multistage TECs. When the temperature difference between the hot and cold faces doesn't need to be more than about 60° C., single-stage TECs can normally do the job. If the temperature difference needs to be greater than 60° C., cascades should be considered.

TECs are very small, very light weight, and, unlike a compressor of an air conditioner, completely silent. With no moving parts, they are extraordinarily reliable. TECs generate little, if any, electrical noise and can provide precision temperature control when used with an appropriate controller. They can be operated in a vacuum or weightless environments, and in any physical orientation. On the other hand, TECs tend to lose their competitive advantage when cooling loads exceeding 200 W. Under some special circumstances, however, TECs are used to pump loads of tens of kilowatts.

Proper installation of TEC's is important but not very difficult. Manufacturers normally provide detailed, illustrated assembly instructions.

TECs may readily be used to effect temperature control. TECs are DC devices. The amount of heat pumped through the TEC is directly proportional to the power supplied. Temperature may be controlled through manual or automatic means. The automatic controller can range from a simple on-off thermostat to a complex computer controlled feedback circuit. Such control systems are available from a variety of qualified manufacturers.

There are four engineering parameters which define the cooling performance of a thermoelectric module or system, herein referred to as a "TE device": Delta T is the hot plate temperature, $T_h$, minus cold plate temperature, $T_c$, of the TE device. Q is the total heat pumped by the TE device at the surface defined by $T_c$. I is the current drawn by the TE device. V is the voltage applied to the TE device. Typically a manufacturer of a TEC supplies a performance chart that can be used to define all four engineering parameters providing that two are known, or, at least defined by a given cooling requirement. Generally, the $T_c$ and Q are known and the I and V needed to produce this cooling is of interest. In other cases, the user may apply the performance chart to analyze a test result where the user has been able to measure V, I and $T_c$ and wants to know what heat is being pumped, Q. If the latter is the case, the user should try to measure current, I, and use this in the analysis rather than V. V can be misleading since it can include effects of wiring, and other external resistance. In contrast, the current, I, will be truly flowing through the TE device.

TE assemblies for use in air are employed in, typically, small refrigerators, fish-keepers for boats or electronic enclosures. The installer just cuts a hole, bolts on the TEC and plugs it in. With a cooled (or heated) air stream, the uses of these "miniature air-conditioners" is limited only by the imagination of the user.

Cold plate TE assemblies are a simple and effective use of thermoelectrics where direct contact is made to the TE module, or to the TE module via an aluminum cold plate. This provides for precise temperature control and very rapid heating or cooling. The units typically have tapped holes in the cold plate for easy interface to the item to be cooled.

Water TE assemblies circulate water through a TE-cooled or heated cold plate. If further flowed through a (typically) vinyl pad even the most difficult and irregular objects—such as, for example, the human knee—can be heated or cooled. Water-circulating TE assemblies are sued to keep aquarium water always at the desired temperature.

2.2.1 Specific Prior Art Thermoelectric Coolinq Elements

Thermoelectric cooling elements are advanced technology devices originally seeing use in, among other places, the United States space program. For example, U.S. Pat. No. 5,092,129 to Bayes, et. al. issued Mar. 3, 1992, for a SPACE SUIT COOLING APPARATUS assigned to United Technologies Corporation (Hartford, Conn.) concerns an apparatus for removing heat energy of a cooling medium passing from a space suit liquid cooling garment. The apparatus includes a heat sink assembly for absorbing and rejecting the heat energy and a heat transfer means for transferring the heat energy of the cooling medium to the heat sink assembly. The heat transfer means, which is comprised of an array of thermoelectric modules, regulates the quantity of heat energy transferred from the cooling medium to the heat sink assembly. The heat sink assembly includes a material which isothermally changes phase while absorbing heat energy.

More relevant to such intended use of a thermoelectric cooling element in the present invention as will shortly be explained, U.S. Pat. No. 4,143,71 to Beitner issued Mar. 13, 1979, for a PORTABLE REFRIGERATOR UNIT assigned to Bipol Ltd. (Ill.) concerns a portable refrigerator unit is cooled by a thermoelectric element of the Peltier type. The element has hot and cold faces adapted to be energized by an external DC source, which can be disconnected from the unit to make the unit entirely portable. The thermoelectric unit has a cold face in contact with an internal thermal sink, which in turn is in contact with a heat conducting lining, and its hot face in contact with an external thermal sink, having heat dissipating means associated therewith. The internal thermal sink has a large portion imbedded in an insulated wall of the unit, and a relatively small portion having a face free of the insulating material, which free face is in heat-transfer contact with the cold face of the thermoelectric unit. The external thermal sink with its heat dissipating means is spaced from said unit so that its surfaces are exposed to the ambient atmosphere. The external thermal sink and its associated heat dissipating means is made of a single sheet having a flat central portion, laterally extending loops with the free ends thereof underlying the flat central portion with the three portions in heat-transfer contact with each other to form the thermal sink.

2.2.2 Specific Prior Art Usage of Thermolectric Elements In Building Heating or Cooling U.S. Pat. No. 5,385,020 to Gilliam, et. al. issued Jan. 31, 1995, for a THERMOELECTRIC AIR COOLING METHOD WITH INDIVIDUAL CONTROL OF MULTIPLE THERMOELECTRIC DEVICES assigned to Pneumo Abex Corporation (Hampton, N.H.) concerns a heating and cooling apparatus having a first gas conduit, a second gas conduit and at least one thermoelectric module. In a first embodiment, structure is provided to introduce moisture into the second gas conduit, upstream of that conduit's association with the thermoelectric module. The introduction of the moisture into the gas within the second gas conduit functions to decrease the temperature between the temperature of the gas in the first conduit and the temperature of the gas in the second conduit, thereby optimizing the operation of the thermoelectric module. In a second embodiment a plurality of thermoelectric modules are arranged in an array and positioned between the gas conduits and associated therewith. The power supplied to each of the thermoelectric modules is adjusted to correspond to an optimum power input calculated for each thermoelectric module respectively. This calculation utilizes a temperature differential between the temperature of the thermoelectric material at the junction of the thermoelectric module with the first gas conduit and the temperature of the thermoelectric material at the junction of the thermoelectric module with the second gas conduit.

SUMMARY OF THE INVENTION

The present invention contemplates precooling the water and/or the air used in and by an evaporative cooler by means of a thermoelectric cooling element, particularly so that the effective operational range of the evaporative cooler may thereby be extended to higher ambient temperatures and/or higher relative humidity.

Extension of the operational range of the evaporative cooler means, in particular for the preferred embodiment, that the evaporative cooler will chill air and/or water to 79° F. or less when the outside ambient air temperature rises to 120° F. at a relative humidity as high as 50%. The goal of extending the operational range of the evaporative cooler is to obviate the necessity of an expensive parallel air conditioning system used in the cooling of buildings, particularly houses, in hot but generally dry climates, such as inland regions of the Southwestern United States.

Therefore, in its principal form the present invention is embodied in a building cooling system having (i) a evaporative cooler in which ambient air is cooled by evaporation of water, and (ii) a thermoelectric cooling element for cooling the water prior to its evaporation by the evaporative cooler.

The building cooling system preferably further includes a thermostatic control for activating the thermolectric cooling element only at such times as the cooled ambient air exceeds a threshold temperature.

These and other aspects and attributes of the present invention will become increasingly clear upon reference to the following drawings and accompanying specification.

DESCRIPTION OF THE PREFERRED EMBODIMENT

Figure 1:
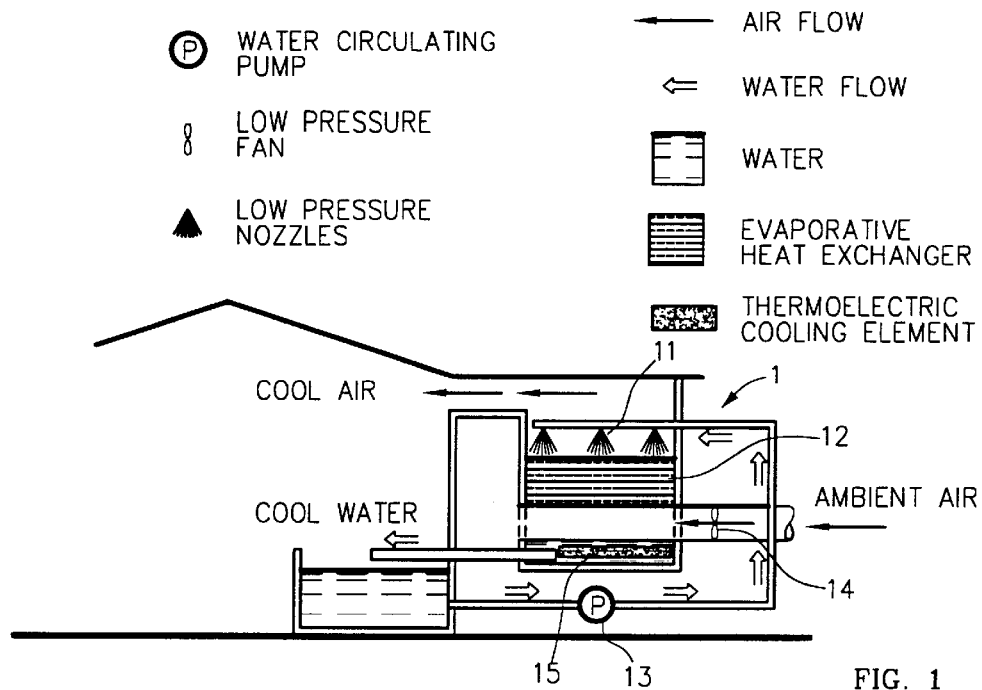
FIG. 1 is a first diagrammatic view showing a preferred embodiment of a building cooling system in accordance with the present invention having both (i) a evaporative cooler and (ii) a thermolectric cooling element.

The present invention is directed to extending the useful performance range of evaporative coolers used in climates that occasionally become so hot that a conventional evaporative cooler alone becomes ineffective to recover a temperature difference from the ambient air (which is typically at temperatures in excess of 100° F.) so as permit direct use of output cooled air in, typically, buildings and homes (where the cooled air is desirably less than 79° F.)

1. Energy Flows, Energy Balances and Economics of the Hybrid Cooling System of the Present Invention Even before the preferred embodiment of a building cooling system in accordance with the present invention is explained, the nature and the magnitude of the contribution of the thermoelectric cooling element to the building cooling, and the economic cost of this contribution, will be explained.

In the first place, the procurement cost of a thermoelectric heating/cooling element per BTU of heat movable by the element is very high. Although one or more thermoelectric elements install easily, are long-lasting and virtually maintenance free, and use electrical energy efficiency in effectuating heat transfer, the (i) low heating/cooling capacities and (ii) high procurement costs of thermoelectric elements have heretofore restricted their use principally to specialty applications such as space and portable heater/coolers. Additionally, these elements use direct current, which requires a power supply in earthbound applications energized by the normal a.c. power grid.

On top of these disadvantages, thermolectric heating/cooling elements in accordance with the present invention will be seen, when they are co-located with evaporative coolers for which they serve as pre-coolers, to be performing heat transfer from a water reservoir (of an evaporative cooler) to the ambient outside air.

When the thermolectric heating/cooling elements is in use for cooling the water in the reservoir of an evaporative cooler, this water may be as warm as, typically, 79° F., and the outside ambient air may be well over 100° F., and even as high as 120° F. There is no problem that a thermolectric heating/cooling element should work in this range, and should pump heat "uphill", but the "hill" is steep, and high. By this it is meant that the thermolectric heating/cooling element may initially appear, in its exposed outside location, to be a "futile gesture", which cannot possibly transfer enough energy to cool a large reservoir of water some 20+° F., and commonly some 40+° F., below ambient.

In point of fact, it does not. It must be understood that the utility of the thermolectric heating/cooling element is simply to cool the water enough, typically only some few ° F., so that the evaporative cooling can continue more efficiently and effectively. The thermolectric heating/cooling element can be said to "extend the range" of the evaporative cooling. The thermolectric heating/cooling element can be said to "leverage the performance" of the evaporative cooling.

The heat transfer of the thermolectric heating/cooling element is only in a narrow sense additive to the heat transfer of the evaporative cooling; it is better expressed that the heat transfer effected by the thermolectric heating/cooling element is "multiplied" by the heat transfer effectiveness of the evaporative cooling. This "multiplication" is not, or course, simple arithmetic "multiplication", but is rather a displacement of the operating point on the thermal transfer (cooling capacity) versus operating temperature curves of an evaporative cooler—see FIG. 3.

Figure 3:
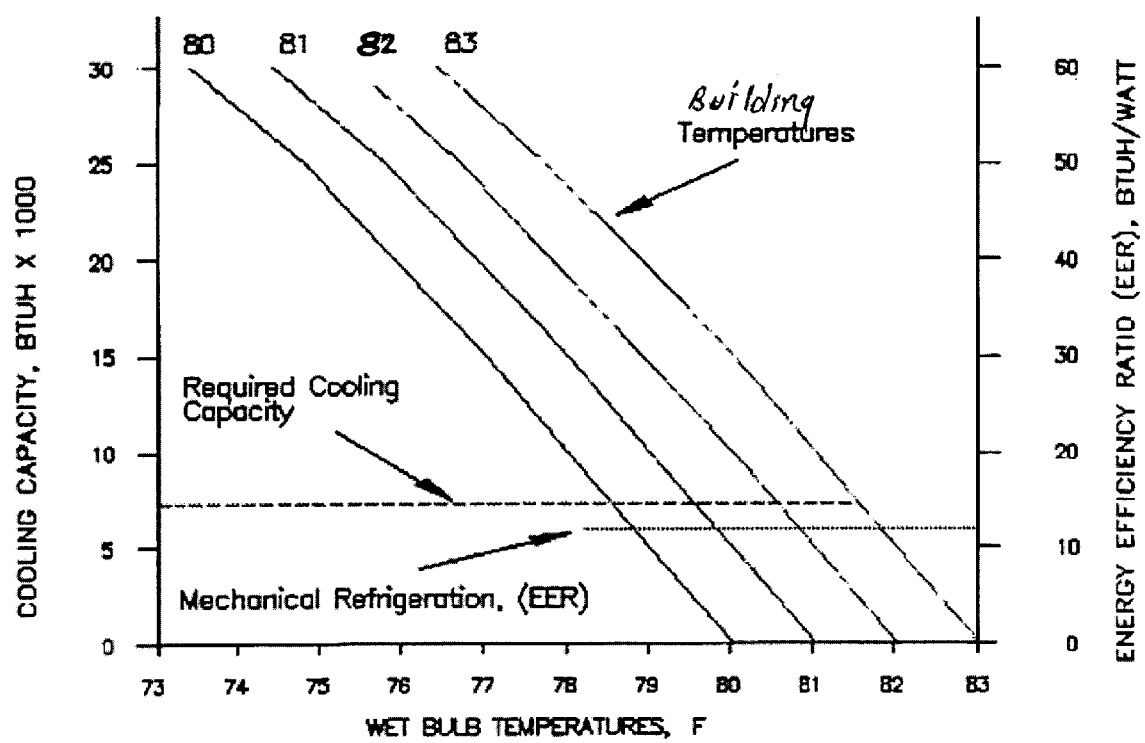
FIG. 3 is a graph of typical performance realizable with the preferred embodiment of a building cooling system in accordance with the present invention.

Some casual study of the curves of FIG. 3 will reveal that, if the temperature can be maintained within operating range, an evaporative cooler can move, and can cost effectively move, thousands of BTU's. This fact is well know in hot climates. The present invention is directed, of course, to extending the range of ambient conditions (ambient air) in which a building size evaporative cooler can still be kept in operational range. (Understand also that an evaporative cooler will "operate" until the water boils, it is the human requirement that the cooled air not be higher than approximately 79° F. that effectively sets the upper usable limit to evaporative cooling.)

2. An Exemplary Embodiment of an Evaporative Cooling System

Figure 2:
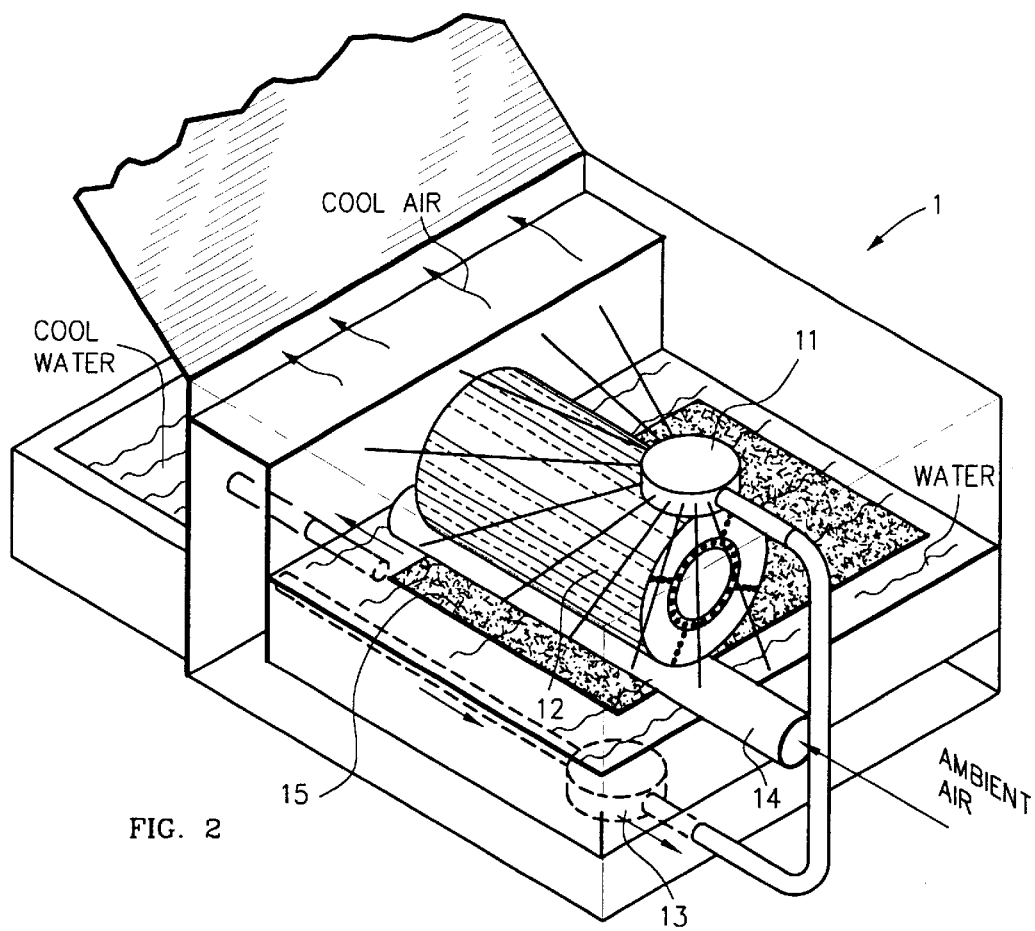
FIG. 2 is a second diagrammatic view showing the same preferred embodiment of a building cooling system in accordance with the present invention having both (i) a evaporative cooler and (ii) a thermolectric cooling element previously seen in FIG. 1.

An exemplary evaporative cooling system in accordance with the present invention, usable on buildings particularly including houses, is diagrammatically shown in FIGS. 1 and 2. The evaporative cooling system 1 consists of low pressure spray nozzles 11, a water-to-air heat exchanger 12, a water circulating pump 13 and a fan 14. The heat exchanger 12 that is shown is a perforated metal matrix, more preferably aluminum metal, and most preferably a perforated aluminum metal rotating drum. It will be understood by practitioners of the evaporative cooler, or "swamp" cooler design arts that the heat exchanger might have been alternatively made such as, by way of example, from polypropylene lines wrapped around layers of wood strips to form a matrix of monofilament lines precisely spaced both vertically and horizontally, typically containing several thousand linear feet per cubic foot of packing section.

Water is sprayed from the nozzles 11 and trickles down over the heat exchanger 12 while ambient air was moved upward past the droplets of water. This results in a very economical and effective counterflow heat exchange that could cools both water and air to approximately the wet bulb temperature of the outdoor air.

In accordance with the present invention a thermoelectric cooling element 15 is added to an otherwise convention evaporative cooler. The element 15 is preferably immersed in the cooling water pooled at the bottom of the evaporative cooler 1, and is most commonly in the shape of a thick plate, as may best be seen in FIG. 2.

The design wet bulb temperature for Florida, as given in the American Society of Heating, Refrigeration and Air Conditioning Engineers (ASHRAE) Handbook, ranges between 79–80° F.; the wet bulb temperature does not exceed 80° F. for more than 2.5% of the time.

Since the desired building, or household, temperatures (72–79° F.) are usually above the wet bulb temperature, the evaporative cooling system can be used for cooling the air inside the house.

For the 20 foot by 30 foot house for which a study was made, a ⅙ hp pump was required to circulate 20 gallons of water at a rate of 12 gallon per minute (gpm) against a 20-foot head through the 2.8×2.8×2 foot deep heat exchanger. A ⅓ hp fan was required to move outside air through the heat exchanger at a rate of 2500 cubic feet per minute (cfm) and discharge it into the 20×30 foot house.

3. Performance of the Exemplary Evaporative Cooler

Heat gained by the house and piping was calculated to be about 6,000 British thermal units per hour (Btuh) for a 15° F. temperature difference between the house temperature and the ambient temperature. Heat gained from the circulating pumps brought the total heat gain to be about 8,000 Btuh. The evaporative cooler had to remove 8,000 Btuh from the circulating water in order to maintain the house at the desired temperature.

The performance of the evaporative cooling system is based on data collected from the demonstration system described above, and shown in FIG. 3. It is seen that the evaporative cooler produced the 8,000 Btuh of cooling required (dashed horizontal line) even when the ambient wet bulb temperature was as high as 78.5° F. with an 80° F. house temperature. If the house temperature was allowed to rise to 83° F. (admittedly uncomfortable), the evaporative cooler could accomplish the cooling when the wet bulb temperature was as high as 81.5° F. Wet bulb and dry bulb temperature data measured under Florida conditions in July showed that the wet bulb temperature exceeded 81° F. for only a few hours during a typical three-week period (FIG. 3). The wet bulb temperature fell to at least 75° F. on nearly every night. This indicated that the evaporative cooler alone should provide for adequate cooling if the particular humans and other living animals in the house could tolerate several hours of temperature in the 80° F. range with fluctuations in temperature as high as 83° F. and, rarely, even higher.

Unfortunately, most Americans circa 1997 will not abide by this, and the evaporative cooler is turned off and the (all-electric) air conditioning turned on.

In accordance with the present invention, the answer to this dilemma is not to turn the evaporative cooler 1 off (and the house air conditioning on) but rather to turn on electric power to the thermoelectric cooler 15 which will, by reference to the curves of FIG. 3, restore the working fluid (the water) of the evaporative cooler to a temperature where the cooler 1 will suffice to keep the cooling air blown into the house in a tolerable range. In other words, the thermoelectric cooler 15 serves to extend the useful operative range of the entire evaporative cooler 1, even if only by a few fives and tens of ° F.

4. System Energy Efficiency

A comparison of the cooling output per unit of power required (energy efficiency ratio-EER) for the combined mechanical and electrical refrigeration cooling of the evaporative cooler 1 is shown in FIG. 3. The required cooling capacity is shown by the horizontal solid line.

Generally speaking, the evaporative cooler is more efficient than the mechanical refrigeration when the wet bulb temperature is more than 1° F. below the house temperature. In fact, when the wet bulb temperature is 5° F. below the house temperature, the evaporative cooler is more than four times as efficient as mechanical refrigeration.

For a difference in temperature less than or equal to 1° F., mechanical refrigeration may be more energy efficient. For example, the evaporative cooler produced 5000 Btuh of cooling for a 79° F. wet bulb temperature and a 80° F. house temperature; however, the corresponding EER of 10 was less than the 12 for mechanical refrigeration. This means that the evaporative cooler was less energy efficient at this temperature than mechanical refrigeration and that mechanical refrigeration should be used under these conditions if available.

Figure 4:
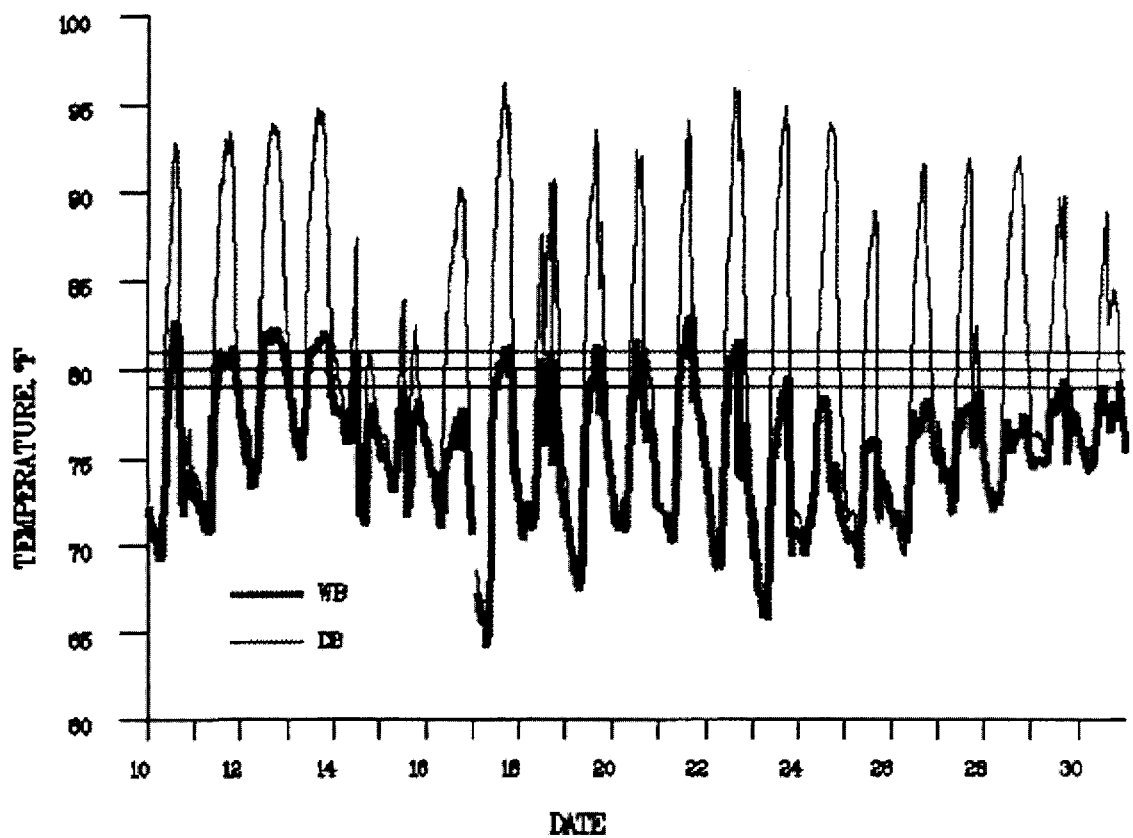
FIG. 4 is a graph showing prior art wet bulb and dry bulb temperature data, particularly as were measured under Florida conditions in July, showing that the wet bulb temperature exceeded 79° F. for only a few hours during a typical three-week period, and that there is accordingly only a limited portion of the day when the thermolectric cooling element must be expensively electrically energized to effect additional building cooling.

Accordingly, the goal of the thermoelectric heating/cooling element should be to keep the wet bulb temperature 5° below house temperature which house temperature is, in American and particularly in southern American regions during summer, approximately 78° F. The wet bulb temperature is thus desirably kept at 73° F. If the prevailing wet bulb and dry bulb temperature data measured under Florida conditions in July of the previous section are remembered, this means that the wet bulb temperature must be, at the worst save for but only a few hours during a typical three-week period, lowered from 81° F. to 73° F. See FIG. 4.

A thermoelectric heating/cooling element 15 sufficient in capacity to lower the wet bulb temperature 8° is thus both useful and appropriate to the hypothetical Florida house. Lowering the wet bulb temperature 8° F. will have an approximately equal effect on the temperature of the air temperature output from the evaporative cooler. Approximately 56 cubic feet of air can be raised or lowered in temperature 1° F. by 1 b.t.u. of heat energy. Recalling the exemplary house, to lower 2500 cubic feet of air per minute 1° F. in temperature requires approximately 45 b.t.u. per minute, or 2700 b.t.u. per hour. To lower 2500 cubic feet of air per minute 8° F. requires approximately 360 b.t.u. per minute, or 21,600 b.t.u. per hour. One (1) b.t.u equals 0.0002928 kw.-hr., and 21,600 b.t.u. are equivalent to the consumption of about 6.3 kw.-hr. of electricity each hour. If the peak cooling hours of the day last, say, eight hours (from 2:00 P.M. to 10:00 P.M), then the total consumption of electrical energy might total approximately 50 kW hours, or $5.00 U.S. at $0.10 U.S. (ten cents U.S.) per kw.-hr.

This much electrical energy is admittedly not inexpensive. However, the air conditioning load to lower an ambient air temperature of, typically, 100° F. to the same 73° F. indoor temperature is proportionately higher (as 27° F. is to 8° F., or over three times).

An argument could be made that the power required to operate the fan on the evaporative cooling system as part of the water cooling system should not be considered in the energy budget, and comparison, since all structures will need some ventilation for cooling. An evaporative cooler can maintain the same temperature in the structure as a conventional exhaust fan system with considerably less air exchange since the evaporative cooler produces air 5–10° F. lower than the ambient dry bulb temperature.

This usually results in a required air exchange rate of less than 50% of that for a conventional exhaust fan. If the fan were not considered part of the evaporative cooling system for the purpose of energy calculations, the EER would be more than doubled for the to evaporative cooler.

To say again, in certain real-world operational regimes the added thermoelectric cooler of the present invention more than doubles the energy efficiency of the already energy efficient evaporative cooler. This is no small boon, and very useful.

Furthermore, the power required to operate the fan in the ventilation system would be significantly reduced. Another advantage of extending the operation range of the evaporative cooling system is that its initial procurement cost is at least 50% less than that of a mechanical refrigeration system. This also has an energy impact since increased equipment costs translate into increased indirect energy input. Indirect energy (energy required to produce product) can be determined by using standard Btu/$ ratios for a particular category of products.

Assuming that one half of the 1000 houses having both air conditioning and evaporative coolers were to be converted to the system of the present invention, it has been estimated that a ⅓ savings over the cost of air conditioning could be made while the hybrid evaporative cooler/thermoelectric element system is operative in lieu of air conditioning. The air conditioning for these 1000 homes costs 10 million kwh. Using a conservative estimate that 75% of the time the hybrid system could be used in lieu of air conditioning, and during this time only ⅔ the energy of straight air conditioning would be used, the cooling accomplished by extended usage of the already-existing the evaporative cooler could save 2.5 million kwh (3.4×1010 Btu of fossil fuel equivalents). At the assumed typical rate of $0.10 U.S. (ten cents U.S.) per kw.-hr. electricity cost, the savings is $100,000 U.S. for 1,000 homes, or $1,000 per home per year. The payback time of the thermoelectric elements, which should cost less than $1,000 and which may easily be retrofitted to existing evaporative coolers, is thus less than one year.

5. Preferred Components, and Prototype Installation

The exemplary system cooling system analyzed for purposes of the present invention, and the teaching of this specification, is modeled on the real home of Randy Cullom, and Professor L. Elizabeth Seiberling (215 Williamson Hall, 528 Nuclear Science Center, University of Florida) near Interlachen, Florida. Data is courtesy of their website http://www.phys.ufl.edu/~liz/home.html.

The cooling system in their "Florida Solar Cracker House", necessary to keep cool and dry during the summer, is realized directly with thermoelectric elements.

In accordance with the present invention, the elements are not used directly, but in conjunction with an evaporative cooler. As with the Cullom/Seiberling usage, the preferred thermolectric elements are simple and quiet and require little maintenance. The collective elements weigh about 20 lbs.

The preferred "assisted" evaporative cooling of the present invention, which is called "ThermoElectric Assisted Evaporative Cooling" (TAEC), is based on solid state thermoelectric (or Peltier Effect) chips. These are small devices that get very hot on one side and very cold on the other when a low voltage and high current source is applied.

The preferred company for provision of the chips is Melcor Corporation, 1040 Spruce Street, Trenton, N.J. 08540. Their corporation and product data is on the World Wide Web at www.melcor.com.

This preferred TAEC uses 12 each of hand-size chips and heat sinks for which the price each is about $50.00, so that all of the chips and heat sinks will cost about $1,200 for the TAEC.

As previously explained, thermoelectric coolers (TECs) are solid state heat pumps that utilize the Peltier effect. During operation, DC current flows through the TEC causing heat to be transferred from one side of the TEC to the other, creating a cold and hot side. A single-stage TEC can achieve temperature differences up to 70° C., or can transfer heat at a rate of 125 W. To achieve greater temperature differences (up to 131° C.), select a multistage (cascaded) TEC. To increase the amount of heat transferred, the TEC's modular design allow the use of multiple TECs mounted side-by-side.

Thermoelectrics are cost effective solutions for certain applications. They permit economical quick cooling to below ambient. They have only modes space, size and weight. They are reliable and solid-state in operation with no sound or vibration. Typical lifetimes are more than 200,000 hours. They permit precision temperature control capability. They have minimum, if any, electrical noise. They may suitably be DC powered. Either heat or cooling is possible by changing direction of current flow. More than 150 standard types available, from sub-miniature, low capacity to compact, high capacity. Multistage cascades are possible. Operation is permitted to below −100° C. The thermoelectrics come in standard sizes or can be designed to specifications.

The POLARTEC™ thermoelectric modules of said Melcor are preferred in the application of the present invention. This series was developed specifically for low cost, high volume, commercial applications such as portable cool boxes, beverage can coolers, water coolers and small refrigerators. The series includes PolarTEC versions of the manufacturer's most popular TECs, covering a full range of size, power and heat pumping capacities.

6. Summary

The hybrid thermoelectric heating/cooling element and evaporative cooler system of the present invention as set forth in this specification is inexpensive, simple and considerably more energy efficient than pure mechanical refrigeration (air conditioning) for most conditions. Based on a design wet bulb temperature for Florida of 79–80° F. and an analysis of actual weather data, it appears that the hybrid system can provide essentially all of the cooling necessary for household cooling, especially if the occupants can tolerate rare indoor temperatures in the low 80's ° F. If these temperatures cannot be tolerated then a mechanical refrigeration system (air conditioning) is recommended to provide alternative cooling. The cost to operate this mechanical refrigeration system (air conditioning) should be reduced since wet bulb temperatures in excess of 80° F. occur only for short periods.

In accordance with the preceding explanation, variations and adaptations of the system for the thermoelectric precooling of water for an evaporative cooler in accordance with the present invention will suggest themselves to a practitioner of the thermal, evaporative cooling and air conditioning arts.

In accordance with these and other possible variations and adaptations of the present invention, the scope of the invention should be determined in accordance with the following claims, only, and not solely in accordance with that embodiment within which the invention has been taught.

What is claimed is:

1. A building cooling system comprising:
    a evaporative cooler in which ambient air is cooled by evaporation of water; and
    a thermoelectric cooling element for cooling the water prior to its evaporation by the evaporative cooler.

2. The building cooling system according to claim 1 further comprising:
    a thermostatic control activating the thermolectric cooling element only at such times as the cooled ambient air exceeds a threshold temperature.

3. The building cooling system according to claim 1 wherein the thermolectric cooling element comprises:
    Peltier effect cooling elements and heat sinks packaged as a unit.

4. The building cooling system according to claim 1 wherein the thermolectric cooling element comprises:
- a plurality of Peltier effect cooling elements in a multistage, cascaded, arrangement.

5. A method of cooling a building comprising:
- cooling ambient air in an evaporative cooler by evaporation of water; while
- cooling the water used in the evaporative cooler at a time prior to its evaporation by the evaporative cooler by use of a thermolectric cooling element.

6. The method of cooling a building according to claim 5 wherein the cooling of the water used in the evaporative cooler at a time prior to its evaporation by the evaporative cooler by use of a-thermolectric cooling element is not continuous, but is instead controlled by and conditional on
- activating with a thermostat the thermolectric cooling only at such times as the cooled ambient air exceeds a threshold temperature.

* * * * *